(12) United States Patent
Sato et al.

(10) Patent No.: US 11,392,119 B2
(45) Date of Patent: Jul. 19, 2022

(54) AUTONOMOUS DRIVING DEVICE

(71) Applicant: TOYOTA JIDOSHA KABUSHIKI KAISHA, Toyota (JP)

(72) Inventors: Kunihito Sato, Mishima (JP); Kentaro Ichikawa, Sunto-gun (JP); Maiko Hirano, Susono (JP); Bunyo Okumura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 16/881,776

(22) Filed: May 22, 2020

(65) Prior Publication Data

US 2020/0285234 A1   Sep. 10, 2020

Related U.S. Application Data

(63) Continuation of application No. 16/036,064, filed on Jul. 16, 2018, now Pat. No. 10,698,406.

(30) Foreign Application Priority Data

Aug. 25, 2017   (JP) .............................. JP2017-162729

(51) Int. Cl.
*G05D 1/00* (2006.01)
*G01C 21/34* (2006.01)
*G05D 1/02* (2020.01)

(52) U.S. Cl.
CPC ....... *G05D 1/0061* (2013.01); *G01C 21/3415* (2013.01); *G05D 1/0212* (2013.01); *G05D 2201/0213* (2013.01)

(58) Field of Classification Search
CPC ............... G05D 1/0061; G05D 1/0212; G05D 2201/0213; G05D 1/0214; G05D 1/00;
(Continued)

(56) References Cited

U.S. PATENT DOCUMENTS 10,054,942 B2 *   8/2018   Ichikawa ............ B60W 50/082
10,698,406 B2 *   6/2020   Sato .................... G01C 21/3415
(Continued)

FOREIGN PATENT DOCUMENTS

CN   102395499 A   3/2012
CN   107054362 A   8/2017
(Continued)

*Primary Examiner* — Shardul D Patel
(74) *Attorney, Agent, or Firm* — Sughrue Mion, PLLC

(57) ABSTRACT

An autonomous driving device includes an autonomous driving release unit that releases the autonomous driving control if an override operation is input during the autonomous driving control which is based on a first travel plan, a travel plan setting unit that sets a second travel plan different from the first travel plan after the input of the override operation, an autonomous driving restore determination unit that determines whether to restore the autonomous driving control with the autonomous driving control which is based on the second travel plan after the input of the override operation, and a vehicle control unit that maintains the manual driving and prohibits automatic starting of the autonomous driving control until after a predetermined time elapses after the autonomous driving control is released and when the autonomous driving restore determination unit determines not to restore the autonomous driving control.

21 Claims, 4 Drawing Sheets

(58) Field of Classification Search
CPC ........... G01C 21/3415; G01C 21/3605; B60W 50/0098
USPC .......................................................... 701/26
See application file for complete search history.

(56) References Cited

U.S. PATENT DOCUMENTS

| | | | |
|---|---|---|---|
| 2012/0046817 A1 | 2/2012 | Kindo et al. | |
| 2012/0296542 A1* | 11/2012 | Nitz | B60W 10/184 701/70 |
| 2015/0120124 A1* | 4/2015 | Bartels | B60W 50/14 701/23 |
| 2016/0280235 A1* | 9/2016 | Sugaiwa | G05D 1/0061 |
| 2016/0280236 A1* | 9/2016 | Otsuka | B60W 50/082 |
| 2017/0101080 A1* | 4/2017 | Brannstrom | B60T 7/12 |
| 2017/0120908 A1 | 5/2017 | Oniwa et al. | |
| 2017/0220039 A1* | 8/2017 | Funakawa | B60W 50/14 |
| 2017/0233004 A1* | 8/2017 | Hatano | B62D 6/002 701/41 |
| 2017/0235305 A1* | 8/2017 | Jung | B60W 50/082 701/23 |
| 2018/0120844 A1* | 5/2018 | Okamoto | B60W 30/14 |
| 2019/0025825 A1* | 1/2019 | Takahama | B60W 60/0053 |
| 2019/0154143 A1* | 5/2019 | Ganske | F16H 59/66 |

FOREIGN PATENT DOCUMENTS

| | | |
|---|---|---|
| DE | 11 2010 002 279 T5 | 12/2012 |
| JP | 2015-168369 A | 9/2015 |

\* cited by examiner

AUTONOMOUS DRIVING DEVICE

CROSS REFERENCE TO RELATED APPLICATIONS

This application is a Continuation of U.S. application Ser. No. 16/036,064 filed Jul. 16, 2018, which claims priority to Japanese Patent Application No. 2017-162729 filed Aug. 25, 2017. The entire disclosures of the prior applications are considered part of the disclosure of the accompanying continuation application, and are hereby incorporated by reference.

TECHNICAL FIELD

An aspect of the present disclosure relates to an autonomous driving device.

BACKGROUND

In the related art, as a technical literature relating to an autonomous driving device, Japanese Unexamined Patent Publication No. 2015-168369 is known. In Japanese Unexamined Patent Publication No. 2015-168369, a technology for restoring a driving control to an autonomous driving control when a driver releases a hand from a steering wheel after a driver's intervention operation (override operation) during the autonomous driving control.

SUMMARY

Recent years, an autonomous driving device that automatically starts an autonomous driving control of a vehicle when an autonomous driving start condition is satisfied, has been developed. In such an autonomous driving device in the related art described above has a room for improvement regarding restoration to the autonomous driving control, that is, there is a possibility that the driving may be restored to the autonomous driving control contrary to the occupant's intention after the override operation.

An aspect of the present disclosure has an object of restoring the autonomous driving control according to the occupant's intention after the override operation, in the autonomous driving device which automatically starts the autonomous driving control of the vehicle when the autonomous driving start condition is satisfied.

An autonomous driving device in an aspect of the present disclosure is configured to automatically start an autonomous driving control of a vehicle when an autonomous driving start condition is satisfied. The autonomous driving device includes: an autonomous driving release unit configured to release the autonomous driving control if an override operation for shifting the driving of the vehicle to a manual driving is input by an occupant of the vehicle during the execution of the autonomous driving control which is based on a first travel plan; a travel plan setting unit configured to set a second travel plan different from the first travel plan based on a peripheral state of the vehicle and a state of the vehicle after the input of the override operation by the occupant; an autonomous driving restore determination unit configured to determine whether or not to restore the autonomous driving control with the autonomous driving control which is based on the second travel plan after the input of the override operation by the occupant based on operation parameters relating to the override operation, the first travel plan, and the second travel plan; and a vehicle control unit configured to automatically start the autonomous driving control which is based on the second travel plan after the autonomous driving control is released by the autonomous driving release unit and when the autonomous driving restore determination unit determines to restore the autonomous driving control.

It is found that it is possible to determine whether the restoration of the autonomous driving control which is based on the second travel plan is in accordance with the occupant's intention or not based on the operation parameters relating to the override operation, the first travel plan based on which the automatic driving control executed at the time of inputting the override operation, and the second travel plan set after the override operation. For example, if the operation parameter is large, it can be assumed that the occupant is not favorable to the first travel plan, and if the difference between the first and the second travel plans is small, it can be determined that the restoration to the autonomous driving control which is based on the second travel plan does not match the intention. On the other hand, if the difference between the first and the second travel plans is large, it can be determined that the restoration to the autonomous driving control which is based on the second travel plan matches the intention. In an aspect of the present disclosure, using such a knowledge, the autonomous driving control can be restored after override operation. That is, in the autonomous driving device which automatically starts the autonomous driving control of the vehicle when the autonomous driving start condition is satisfied, it is possible to restore the autonomous driving control according to the occupant's intention after the override operation.

In an aspect of the present disclosure, the autonomous driving restore determination unit may determine that the restoration of the autonomous driving control is possible if the operation parameter is larger than a set value and when a difference between a position on a route in the first travel plan and a position on a route in the second travel plan is longer than a set distance. According to this configuration, by specifically using such a knowledge described above, the autonomous driving control can be restored after override operation.

In an aspect of the present disclosure, the autonomous driving restore determination unit may determine that the restoration of the autonomous driving control is possible if the operation parameter is equal to or smaller than the set value and when the difference between the position on the route in the first travel plan and the position on the route in the second travel plan is equal to or shorter than the set distance. For example, if the operation parameter is small, it can be assumed that the occupant is favorable to the first travel plan, and if the difference between the first and the second travel plans is small, the restoration to the autonomous driving control which is based on the second travel plan matches the intention. On the other hand, if the difference between the first and the second travel plans is large, it can be determined that the restoration to the autonomous driving control which is based on the second travel plan does not match the intention. According to this configuration in an aspect of the present disclosure, by specifically using such a knowledge described above, the autonomous driving control can be restored after override operation.

In an aspect of the present disclosure, the travel plan setting unit may newly generate a travel plan based on the peripheral situation of the vehicle and the state of the vehicle immediately after the input of the override operation, and sets the generated travel plan as the second travel plan. According to this configuration, the second travel plan can appropriately be set according to the peripheral situation of the vehicle and the traveling state of the vehicle.

In an aspect of the present disclosure, the travel plan setting unit may set one of a plurality of travel plan candidates generated based on the peripheral situation of the vehicle and the state of the vehicle as the first travel plan, and after the input of the override operation by the occupant, the travel plan setting unit may set a travel plan candidate that is another one of the plurality of travel plan candidates and has the closest route to the position of the vehicle immediately after the input, as the second travel plan. According to this configuration, the first and the second travel plans can appropriately be set according to the peripheral situation of the vehicle and the traveling state of the vehicle.

According to an aspect of the present disclosure, in the autonomous driving device which automatically starts the autonomous driving control of the vehicle when the autonomous driving start condition is satisfied, it is possible to restore the autonomous driving control according to the occupant's intention after the override operation.

DETAILED DESCRIPTION

Hereinafter, an embodiment will be described with reference to the drawings. In the description, the same reference signs will be given to the same elements, and the descriptions thereof will not be repeated.

Figure 1:
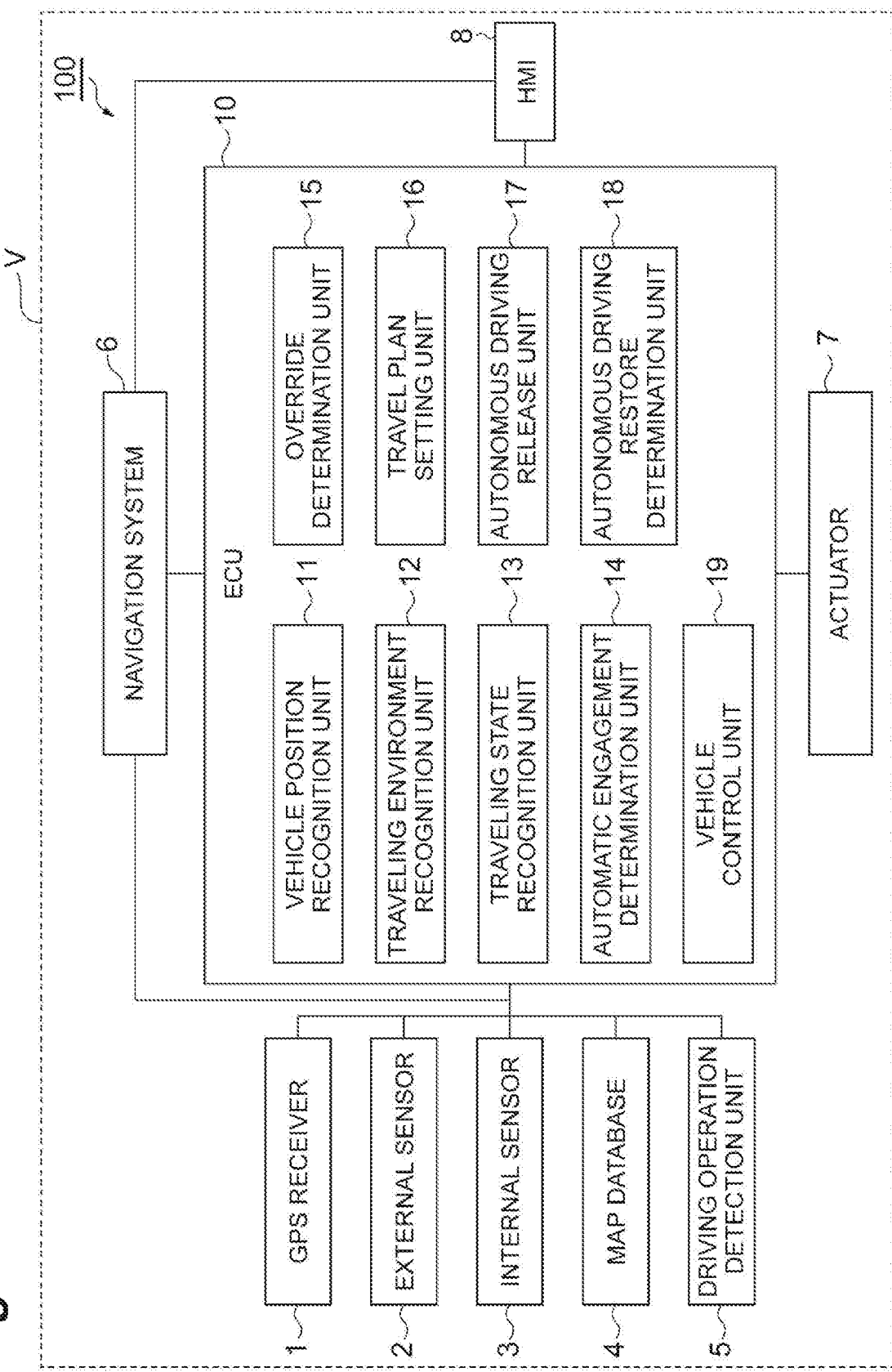
FIG. 1 is a block diagram illustrating an autonomous driving device in an embodiment.

FIG. 1 is a block diagram illustrating an autonomous driving device in an embodiment. An autonomous driving device 100 illustrated in FIG. 1 is mounted on a vehicle V such as a passenger car and executes an autonomous driving control of the vehicle V. The autonomous driving control is a vehicle control for the vehicle V to be autonomously traveled to a destination set in advance. In the autonomous driving control, the occupant (including the driver) does not need to perform a driving operation, and the vehicle V autonomously travels.

As illustrated in FIG. 1, the autonomous driving device 100 includes an electronic control unit (ECU) 10 that performs an overall management of the system. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic control units.

The ECU 10 is connected to a GPS receiver 1, an external sensor 2, an internal sensor 3, a map database 4, a driving operation detection unit 5, a navigation system 6, an actuator 7, and a human machine interface (HMI) 8.

The GPS receiver 1 measures a position of the vehicle V (for example, latitude and longitude of the vehicle V) by receiving signals from equal to or more than three GPS satellites. The GPS receiver 1 transmits the measured position information of the vehicle V to the ECU 10.

The external sensor 2 is a detection device that detects a surrounding environment of the vehicle V. The external sensor 2 includes at least one of a camera and a radar sensor. The camera is an imaging device that images the external situation of the vehicle V. The camera is provided on the inside of a windshield of the vehicle V and images the front of the vehicle V. The camera transmits image information relating to surroundings of the vehicle V to the ECU 10. The camera may be a monocular camera or may be a stereo camera. The stereo camera has two imaging units that are arranged so as to reproduce a binocular parallax. The radar sensor is a detection device that detects obstacles around the vehicle V using radio waves (for example, millimeter waves) or light. The radar sensor includes, for example, millimeter wave radar or a light detection and ranging (LIDAR). The radar sensor transmits the radio wave or light to the surroundings of the vehicle V, and detects the obstacles by receiving radio waves or light reflected from obstacles. The radar sensor transmits the detected obstacle information to the ECU 10. Obstacles include fixed objects such as guardrails and buildings, and pedestrians, bicycles, other vehicles, and the like.

The internal sensor 3 is a detection device that detects a travel state and a vehicle state of the vehicle V. The internal sensor 3 includes a vehicle speed sensor, an accelerator sensor, and a yaw rate sensor. The vehicle speed sensor is a detection device that detects a speed of the vehicle V. As the vehicle speed sensor, for example, a vehicle wheel speed sensor is used, which is provided on vehicle wheels of the vehicle V or on a drive shaft rotating integrally with vehicle wheels, and detects a rotational speed of the vehicle wheels. The vehicle speed sensor transmits the detected vehicle speed information (vehicle wheel speed information) to the ECU 10. The accelerator sensor is a detection device that detects an acceleration of the vehicle V. The accelerator sensor includes, for example, a longitudinal accelerator sensor that detects acceleration in the longitudinal direction of the vehicle V and a lateral accelerator sensor that detects a lateral acceleration of the vehicle V. The accelerator sensor transmits, for example, acceleration information of the vehicle V to the ECU 10. The yaw rate sensor is a detection device that detects a yaw rate (rotation angular velocity) around the vertical axis at the center of gravity of the vehicle V. As the yaw rate sensor, for example, a Gyro sensor can be used. The yaw rate sensor transmits the detected yaw rate information of the vehicle input device to the ECU 10. The internal sensor 3 includes a door sensor that detects the opening and closing of the door of the vehicle V as the vehicle state.

The map database 4 is a database storing the map information. The map database 4 is formed, for example, in a hard disk drive (HDD) mounted on the vehicle V. The map information includes information on the position of the road, information on the shape of the road (for example, types of curves or straight roads, a curvature of the curve, or the like), information on the width of the road, information on the height of the road, information on the position of the intersection, merging point, and the branch, and information on the position of a building. The map information also includes traffic regulation information such as a speed limit associated with the position information. The map information also includes facility data including positions of the facilities and the types of the facilities (types of schools, hospitals, stations, convenience stores, and the like). The map database 4 may be stored in a computer in a facility such as a management center that can communicate with the vehicle V.

The driving operation detection unit 5 detects the driving operation of the occupant. The driving operation detection unit 5 includes, for example, an accelerator pedal sensor, a brake pedal sensor, and a steering sensor. The accelerator pedal sensor detects an amount of a depression of an accelerator pedal by the occupant. The brake pedal sensor detects an amount of a depression of a brake pedal by the occupant. The steering sensor detects at least one of a steering speed, a steering angle, and a steering torque of the steering wheel by the occupant. The steering sensor may include a touch sensor provided on the steering wheel. The touch sensor detects a gripping force of the occupant's hand grasping the steering wheel. The driving operation detection unit 5 may include a shift sensor for detecting a shift operation of the occupant. The driving operation detection unit 5 transmits the detected driving operation of the occupant to the ECU 10.

The navigation system 6 is mounted on the vehicle V and sets a target route on which the vehicle V travels by the autonomous driving control. The navigation system 6 calculates the target route from the position of the vehicle V to the destination based on the destination set in advance, the position of the vehicle V measured by the GPS receiver 1, and the map information in the map database 4. The destination in the autonomous driving control is set by the occupant of vehicle V operating the input button (or touch panel) of the navigation system 6. The target route is set by distinguishing the lanes that constitute the road. In navigation system 6, the target route can be set by a well-known method. The navigation system 6 may have a function of performing a guidance along the target route during the manual driving of the vehicle V by the occupant. The navigation system 6 outputs the information on the target route of the vehicle V to the ECU 10. A part of the functions of the navigation system 6 may be performed by a server of a facility such as an information processing center capable of communicating with the vehicle V. The function of the navigation system 6 may be performed in the ECU 10.

As in the "driving support device" disclosed in Japanese Patent No. 5382218 (WO2011/158347), or the roadway traveling route in the "autonomous driving device" disclosed in Japanese Unexamined Patent Application Publication No. 2011-162132, when the destination setting is not explicitly performed by the occupant, the target route described here also includes the target route autonomously generated based on the history of past destinations or the map information.

The actuator 7 is a device used for controlling the vehicle V. The actuator 7 includes at least a throttle actuator and a brake actuator. The throttle actuator controls a driving force of the vehicle V by controlling an amount of air (throttle opening degree) supplied to the engine according to an acceleration control command value from the ECU 10. If the vehicle V is a hybrid vehicle, in addition to the amount of air supplied to the engine, the acceleration control command value from the ECU 10 is input to a motor as a power source, and the driving force of the vehicle V is controlled. If the vehicle V is an electric vehicle, the acceleration control command value from the ECU 10 is input to a motor as a power source instead of the throttle actuator, and the driving force of the vehicle V is controlled. The motor as the power source in these cases configures the actuator 7. The brake actuator controls the brake system according to a deceleration control command value from the ECU 10 and controls a braking force applied to the wheels of the vehicle V. For example, a hydraulic brake system can be used as the brake system. The steering actuator controls the driving of an assist motor controlling a steering torque of an electric power steering system according to a steering control command value from the ECU 10. In this way, the steering actuator controls the steering torque of the vehicle V.

The HMI 8 is an interface that performs inputting and outputting of the information between the autonomous driving device 100 and the occupant. The HMI 8 includes, for example, a display, a speaker, and the like. The HMI 8 outputs an image on the display and outputs a voice from the speaker according to a control signal from the ECU 10. The display may be a head-up display. For example, the HMI 8 includes input devices (buttons, a touch panel, a voice input device, or the like) for accepting input from the occupant.

Next, a functional configuration of the ECU 10 will be described. As illustrated in FIG. 1, the ECU 10 includes a vehicle position recognition unit 11, a traveling environment recognition unit 12, a traveling state recognition unit 13, an autonomous engagement determination unit 14, an override determination unit 15, an autonomous driving release unit 17, a travel plan setting unit 16, an autonomous driving restore determination unit 18, and a vehicle control unit 19.

The vehicle position recognition unit 11 recognizes a position of the vehicle V on the map based on the position information from the GPS receiver 1 and the map information in the map database 4. In addition, the vehicle position recognition unit 11 recognizes the position of the vehicle V using the position information on a fixed obstacle such as utility poles included in the map information in the map database 4 and the result of detection by the external sensor 2, using the simultaneous localization and mapping (SLAM) technology. The vehicle position recognition unit 11 may recognize the position of the vehicle V on the map using another well-known method.

The traveling environment recognition unit 12 recognizes a traveling environment which is a peripheral situation of the vehicle V based on the result of detection by the external sensor 2. The position of the obstacle with respect to the vehicle V, the relative speed of obstacle with respect to the vehicle V, and the moving direction of obstacle with respect to the vehicle V and the like are included in the traveling environment. The traveling environment recognition unit 12 recognizes the traveling environment of the vehicle V by a well-known method based on the image captured by the camera and the obstacle information from the radar sensor.

The traveling state recognition unit 13 recognizes a state of the vehicle V during traveling based on the result of detection by the internal sensor 3. The vehicle state includes the vehicle speed of the vehicle V, the acceleration of the vehicle V, and the yaw rate of the vehicle V. Specifically, the traveling state recognition unit 13 recognizes the vehicle speed of the vehicle V based on the vehicle speed information from the vehicle speed sensor. The traveling state recognition unit 13 recognizes the acceleration of the vehicle V (the longitudinal acceleration and the lateral acceleration) based on the acceleration information from the accelerator sensor. The vehicle state recognition unit 13 recognizes the yaw rate of the vehicle V based on the yaw rate information from the yaw rate sensor.

The autonomous engagement determination unit 14 determines whether or not the autonomous driving start condition (an autonomous engagement condition) is satisfied when the vehicle V is in the autonomous engagement mode. The autonomous engagement mode is a mode in which the autonomous driving control of the vehicle V autonomously starts when the autonomous driving start condition is satisfied. The occupant can set the autonomous engagement mode of the vehicle V by inputting a mode setting to the HMI 8.

One of the autonomous driving start conditions can be a condition, for example, that the vehicle V is positioned within a section on the map set in advance where the autonomous driving is possible. The section where the autonomous driving is possible is set, for example, based on an accuracy and freshness of the map information stored in the map database 4. One of the autonomous driving start conditions may be a condition that the error of the position of vehicle V by the vehicle position recognition unit 11 is equal to or smaller than an error threshold value. The error threshold value is a threshold value set in advance. The error of the position of the vehicle V can be obtained by a well-known method.

One of the autonomous driving start conditions may be a condition that the reliability of the autonomous driving device 100 calculated by a well-known method is equal to or greater than a reliability threshold value. The reliability threshold value is a threshold value set in advance. The reliability of the autonomous driving device 100 may be obtained from a reliability of the external sensor 2 and a reliability of the internal sensor 3 and the like. The reliability of external sensor 2 can be obtained from the consistency of the obstacle recognized from, for example, the image captured by the camera in the external sensor 2 and the obstacle information from the radar. One of the autonomous driving start conditions may be a condition that the vehicle V is in a straightly traveling posture and the vehicle speed is equal to or lower than a predetermined threshold value. One of the autonomous driving start conditions may be a condition that a shift lever of the vehicle V is in the D (drive) shift position. One of the autonomous driving start conditions may be a condition that a shift lever of the vehicle V is in the shift position of "A (autonomous)".

The autonomous engagement determination unit 14 determines whether or not the autonomous driving start condition is satisfied based on map information in the map database 4, the position of the vehicle V on the map recognized by the vehicle position recognition unit 11, the traveling environment recognized by the traveling environment recognition unit 12, and the traveling state of vehicle V recognized by the traveling state recognition unit 13.

The override determination unit 15 determines whether or not the override operation is input by the occupant based on the driving operation by the occupant detected by the driving operation detection unit 5 during the autonomous driving control of the vehicle V is executed. The override operation is an intervention operation by the occupant for shifting the operation of the vehicle V from the autonomous driving to a manual driving. The override operation is an operation by the occupant releasing the autonomous driving control and shift the driving to the manual driving.

The override operation includes at least one of an operation by the occupant setting the steering speed of the steering wheel equal to or higher than a first steering speed threshold value, an operation by the occupant rotating the steering angle of the steering wheel equal to or greater than a first steering angle threshold value, an operation by the occupant applying a steering torque to the steering wheel equal to or greater than a first steering torque threshold value. The override operation may include at least one of an operation by the occupant setting the amount of accelerator pedal depression equal to or greater than a first amount of accelerator pedal depression threshold value, an operation by the occupant setting the accelerator pedal depression speed equal to higher than a first accelerator pedal depression speed threshold value, an operation by the occupant setting the amount of brake pedal depression equal to or greater than the first amount of brake pedal depression threshold value, an operation by the occupant setting the brake pedal depression speed equal to or greater than the first brake pedal depression speed threshold value. Each threshold value may be a value set in advance.

The travel plan setting unit 16 generates and set travel plan used for the autonomous driving control based on the map information in the map database 4, the route information from the navigation system 6, the position of the vehicle V on the map recognized by the vehicle position recognition unit 11, the traveling environment of the vehicle V recognized by the traveling environment recognition unit 12, and the traveling state of the vehicle V recognized by the traveling state recognition unit 13.

The travel plan includes a steering plan on steering of the vehicle V and a vehicle speed plan on a vehicle speed of the vehicle V. The steering plan includes a target steering angle according to the position on the route where the vehicle V travels by the autonomous driving control. The position on the route is a position on the map in the extending direction of the route (that is, the target route of the autonomous driving control). Specifically, the position on the route can be a set longitudinal position set at predetermined intervals (for example, 1 m) in the extending direction of the route. The target steering angle is a control target of the steering angle of the vehicle V in the travel plan. The travel plan setting unit 16 generates a steering plan by setting the target steering angle for each position separated by a predetermined distance on the route. Instead of the target steering angle, a target steering torque or a target lateral position (the position in the width direction of the target road of the vehicle V) may be used.

The vehicle speed plan includes a target vehicle speed corresponding to the position on the route where the vehicle V travels by the autonomous driving control. The target vehicle speed is a value of the control target of the vehicle speed of the vehicle V in the travel plan. The travel plan setting unit 16 generates the vehicle speed plan by setting the target vehicle speed for each position separated by a predetermined distance on the route. Instead of the target vehicle speed, a target acceleration or a target jerk may be used. A time may be used as a reference instead of the position on the route (set longitudinal position).

After the override operation is input by the occupant, based on various of information items of immediately after the input, the travel plan setting unit 16 sets a second travel plan different from the first travel plan on which the autonomous driving control is based at the time of the input. Here, if the override determination unit 15 determines that an override operation is input by the occupant, the travel plan setting unit 16 newly generates a travel plan based on various information items of immediately after the input, and sets the newly generated travel plan as the second travel plan.

The first travel plan is a travel plan on which the autonomous driving control executed when the override operation is input is based. The first travel plan is, for example, a travel plan on which the autonomous driving control at a normal time is based, and is a travel plan up to the future a few seconds ahead of the current time, and is a travel plan for the current time to a future time a few seconds ahead. The first travel plan is a travel plan on which a restored autonomous driving control is based immediately after being restored to the autonomous driving control described later. The second travel plan is a travel plan set using various information items of immediately after the input of the override operation. The various information includes at least any one of the map information in the map database 4, the route information from the navigation system 6, the position of the vehicle V on the map recognized by the vehicle position recognition unit 11, the traveling environment of the vehicle V recognized by the traveling environment recognition unit 12, and the traveling state of the vehicle V recognized by the traveling state recognition unit 13.

If the override determination unit 15 determines that the override operation is input by the occupant during the execution of the autonomous driving control which is based on the first travel plan set by the travel plan setting unit 16, the autonomous driving release unit 17 releases the autonomous driving control.

The autonomous driving restore determination unit 18 determines whether or not to restore the autonomous driving control with the autonomous driving control which is based on the second travel plan after the input of the override operation by the occupant based on operation parameters relating to the override operation, the first travel plan and the second travel plan. The operation parameters can be obtained from the driving operation by the occupant detected by the driving operation detection unit 5. For example, the operation parameter is at least any of the steering angles, the steering angle speed, the amount of accelerator pedal depression, accelerator pedal depression, the amount of brake pedal depression, the brake pedal depression speed, and a total operation amount F (refer to following expression) obtained by weighting the steering operation, the brake operation, and the accelerator operation.

$$F = Ks \times S + Kb \times B + Ka \times A$$

S: amount of steering operation (at least any of the steering angle or steering angle speed)

B: amount of brake operation (at least any of the amount of brake pedal depression and/or the depression speed)

A: amount of acceleration operation (at least any of the amount of accelerator pedal depression and the depression speed)

Ks, Kb, and Ka: weighting coefficient

Figure 2:
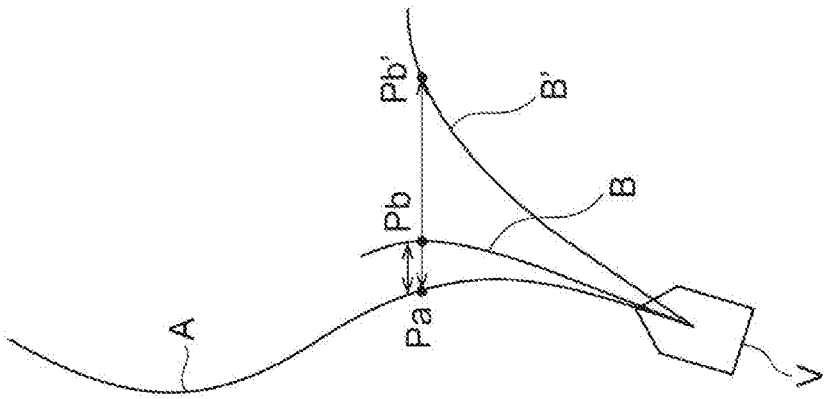
FIG. 2A is a diagram illustrating an example of restore determination condition for determining whether or not to restore the autonomous driving control by the autonomous driving restore determination unit in FIG. 1.
FIG. 2B is a diagram explaining a difference of positions on a route in a travel plan.

As illustrated in FIG. 1 and FIG. 2A, if the operation parameter is larger than a set value and when a difference between the position on the route in the first travel plan and the position on the route in the second travel plan is larger than a set distance, the autonomous driving restore determination unit 18 determines that the restoration of the autonomous driving control is possible. If the operation parameter is equal to or smaller than the set value and the difference between the position on the route in the first travel plan and the position on the route in the second travel plan is equal to or smaller than the set distance, the autonomous driving restore determination unit 18 determines that the restoration of the autonomous driving control is possible.

The set value is a threshold value set for determining whether the operation parameter is large or small. The set value may be a variable value or may be a constant value. The set distance is a threshold value set for determining whether the difference of the position on the route in the travel plan is large or small. The set distance may be a variable value or may be a constant value.

The difference between the positions on the route in the travel plan and the "large" and "small" thereof will be described with an example of travel plans A, B, and B' illustrated in FIG. 2B. The positions Pa, Pb, and Pb' are the positions on the route at t seconds after the input point of the override operation, respectively. For example, regarding the difference of the positions on the route, if the distance between the positions Pa and Pb is equal to or smaller than the set distance, the difference of the positions on the route in the travel plans A and B is "small". If the distance between the positions Pa and Pb' is larger than the set distance, the difference of the positions on the route in the travel plans A and B is "large".

The vehicle control unit 19 executes the autonomous driving control of the vehicle V. The vehicle control unit 19 executes the autonomous driving control of the vehicle V based on the map information in the map database 4, the vehicle position of the vehicle V on the map recognized by the vehicle position recognition unit 11, the traveling environment of the vehicle V recognized by traveling environment recognition unit 12, the traveling state of the vehicle V recognized by the traveling state recognition unit 13, and the travel plan set by the travel plan setting unit 16. The vehicle control unit 19 executes the autonomous driving control of the vehicle V the travel plan by transmitting control command values (the steering control command value, the acceleration control command value, the deceleration control command value, and the like) to the actuator 7. The vehicle control unit 19 can execute the autonomous driving control using a well-known method. The vehicle control unit 19 automatically starts to execute the autonomous driving control if the vehicle V is in the autonomous engagement mode and when the autonomous engagement determination unit 14 determines that the autonomous driving start condition is satisfied.

The vehicle control unit 19 releases the autonomous driving control and shifts the driving of the vehicle to the manual driving when the override determination unit 15 determines that the override driving is performed during the execution of the autonomous driving control. The vehicle control unit 19 shifts the driving of the vehicle to the manual driving by gradually decreasing the control command values to actuator 7 of the vehicle V in the autonomous driving control to zero.

The time from a time when the override determination unit 15 determines that the override is performed at a time when the control command value becomes zero is referred to as a gradual change time. The gradual change times of the steering control command value, the acceleration control command value, and the deceleration control command value may be the same or may be different from each other.

The manual driving also includes a case where a well-known driving support control is executed, which supports the occupant's driving. That is, in the manual driving, the control command value such as adaptive cruise control (ACC), lane keep assist (LKA) and the like as the driving support control may be transmitted to the actuator 7.

After the autonomous driving control is released by the autonomous driving release unit 17 and when the autonomous driving restore determination unit 18 determines to restore the autonomous driving control, the vehicle control unit 19 automatically starts the autonomous driving control which is based on the second travel plan set by the travel plan setting unit 16 (the autonomous driving control is restored to the autonomous driving control according to the second travel plan).

Next, the processing by the autonomous driving device 100 will be described.

Figure 3:
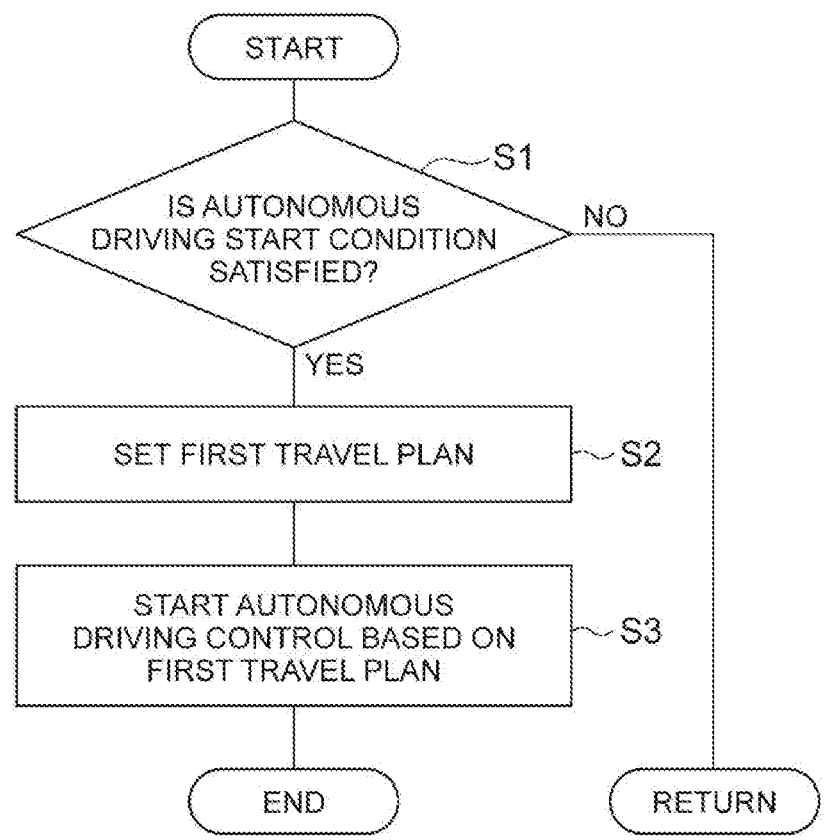
FIG. 3 is a flowchart illustrating processing by the autonomous driving device in FIG. 1.

FIG. 3 is a flowchart illustrating processing for automatically starting the autonomous driving control by the autonomous driving device in FIG. 1. The flowchart in FIG. 3 is performed when the vehicle V is in the autonomous engagement mode and when the vehicle V is in the manual driving.

As illustrated in FIG. 3, the ECU 10 of the autonomous driving device 100 determines whether or not the autonomous driving start condition is satisfied (Step S1). If NO in Step S1, the processing in this cycle ends and the processing shifts to the processing of Step S1 in the next cycle. In YES in Step S1, the first travel plan is set by the travel plan setting unit 16 (Step S2). The vehicle control unit 19 starts the autonomous driving control which is based on the first travel plan (Step S3).

Figure 4:
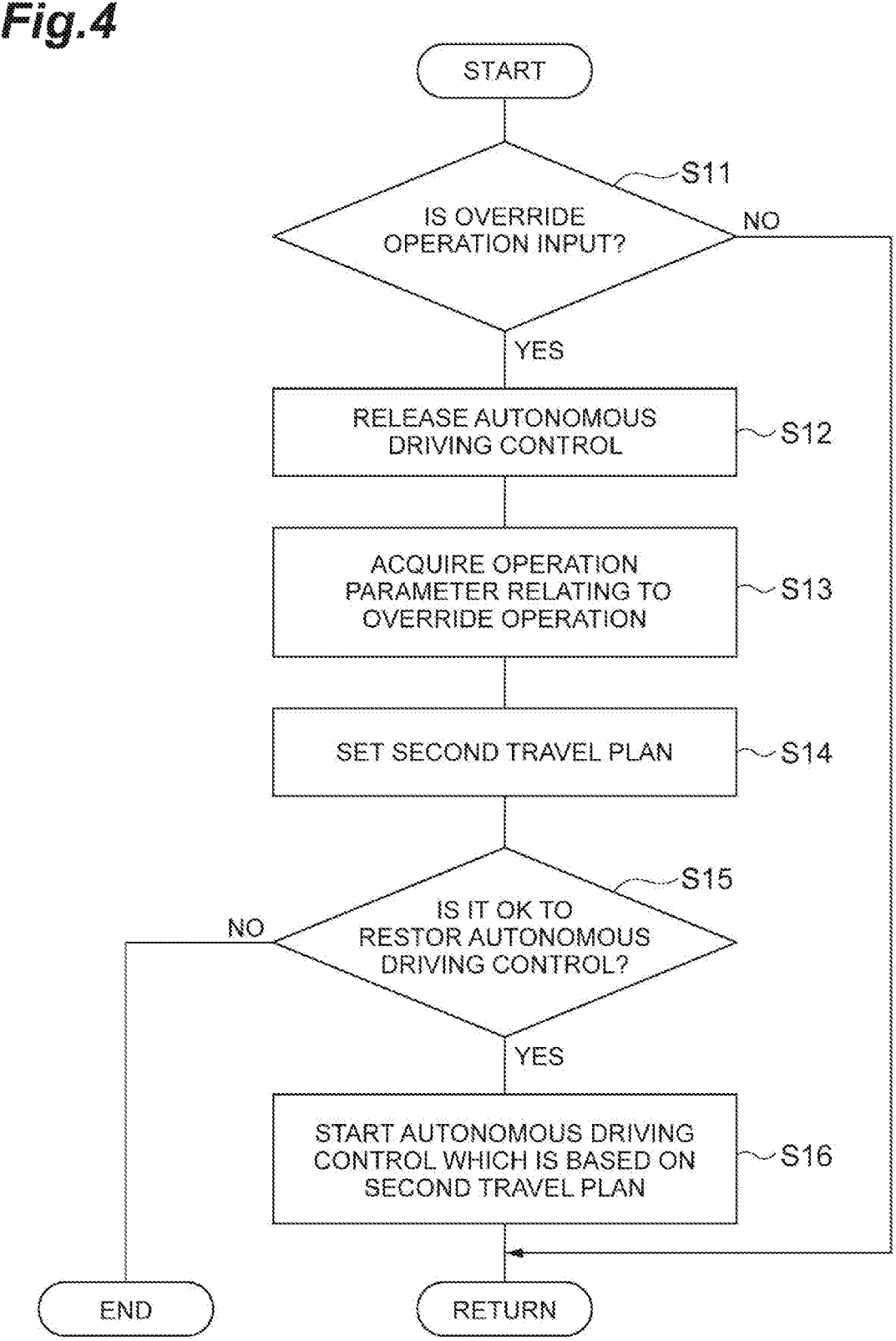
FIG. 4 is a flowchart illustrating another processing by the autonomous driving device in FIG. 1.

FIG. 4 is a flowchart illustrating the processing performed during the execution of the autonomous driving control in the autonomous driving device in FIG. 1. The processing in the flowchart illustrated in FIG. 4 is performed when the autonomous driving control is being executed by the vehicle control unit 19. The travel plan on which the autonomous driving control being executed is based is the first travel plan.

As illustrated in FIG. 4, the ECU 10 of the autonomous driving device 100 determines the presence or absence of the input of the override operation using the override determination unit 15 (Step S11). If NO in Step S11, the processing in this cycle ends and the processing shifts to the processing of Step S11 in the next cycle. If YES in Step s11, the autonomous driving control which is based on the first travel plan is released by autonomous driving release unit 17 (Step S12).

The operation parameter relating to the override operation is acquired based on the driving operation by the occupant detected by the driving operation detection unit 5 (step S13). The travel plan setting unit 16 newly generates the travel plan based on the map information in the map database 4, the route information from the navigation system 6, the position of the vehicle V on the map recognized by the vehicle position recognition unit 11, the traveling environment of the vehicle V recognized by the traveling environment recognition unit 12, and the traveling state of vehicle V recognized by the traveling state recognition unit 13. The travel plan setting unit 16 sets the newly generated travel plan as the second travel plan (step S14).

The autonomous driving restore determination unit 18 determines whether or not to restore the autonomous driving control with the autonomous driving control which is based on the second travel plan based on the operation parameter, the first travel plan, and the second travel plan using the restore determination condition illustrated in FIG. 2A (Step S15). If NO in Step S15, the processing ends and the manual driving is maintained without restoring the autonomous driving control. After ending the processing, the vehicle control unit 19 may prohibit the execution of the autonomous engagement mode until a predetermined time elapses from the ending. Instead of or in addition to this, after ending the processing, the mode may be shifted to a triggered engagement mode and the fact may be notified to the occupant via the HMI 8. The processing after ending the processing is not particularly limited, and various processing in accordance with the ending of the processing may be performed. The triggered engagement mode is a mode in which the autonomous driving control of the vehicle V is started by the operation of the occupant.

If YES in Step S15, the vehicle control unit 19 starts the autonomous driving control which is based on the second travel plan (Step S16). After Step S16, the processing proceeds to Step S11 in the next cycle. The second travel plan for the autonomous driving control started in Step S16 in this cycle becomes the travel plan on which the autonomous driving control being executed is based in the next cycle, and is treated as the first travel plan. In Step S14 in the next cycle, a new second travel plan is set.

Here, using the fact that the restoration of the driving control is determined based on the operation parameter, the first travel plan, and the second travel plan, it can be found that it is possible to determine whether the restoration of the autonomous driving control according to the second travel plan is in accordance with the occupant's intention or not. That is, the occupant's intention to restore the autonomous driving control can be caught by the strength of the override operation and the difference between the first and the second travel plans. For example, if the operation parameter is large, it can be assumed that the occupant is not favorable to the first travel plan. In this case, if the difference between the first and the second travel plans is small, the restoration to the autonomous driving control which is based on the second travel plan does not match the intention. On the other hand, if the difference between the first and the second travel plans is large, it can be determined that the restoration to the autonomous driving control which is based on the second travel plan matches the intention. In addition, for example, if the operation parameter is small, it can be assumed that the occupant is favorable to the first travel plan. In this case, if the difference between the first and the second travel plans is small, the restoration to the autonomous driving control which is based on the second travel plan matches the intention. On the other hand, if the difference between the first and the second travel plans is large, it can be determined that the restoration to the autonomous driving control based on the second travel plan does not match the intention.

According to the autonomous driving device 100 in the embodiment, using such a knowledge, the autonomous driving control can be restored after override operation. In the autonomous driving device 100 which automatically starts the autonomous driving control of the vehicle V when the autonomous driving start condition is satisfied, it is possible to restore the autonomous driving control according to the occupant's intention after the override operation.

In the autonomous driving device 100 in the embodiment, the autonomous driving restore determination unit 18 determines that the restoration of the autonomous driving control is possible if the operation parameter is larger than the set value and when the difference between the position on the route in the first travel plan and the position on the route in the second travel plan is longer than the set distance. The autonomous driving restore determination unit 18 may determine that the restoration of the autonomous driving is possible if the operation parameter is equal to or smaller than the set value and when the difference between the position on the route in the first travel plan and the position on the route in the second travel plan is equal to or shorter than the set distance. According to this configuration, specifically using the above-described knowledge, it is possible to restore the autonomous driving control after the override operation.

In the autonomous driving device 100 in the embodiment, the travel plan setting unit 16 newly generates a travel plan based on the traveling environment and the traveling state of the vehicle V immediately after the input of the override operation, and sets the generated travel plan as the second travel plan. According to this configuration, the second travel plan can appropriately be set according to the traveling environment (peripheral situation) and the traveling state (status) of the vehicle V.

As above, the embodiment was described. However, an aspect of the present disclosure is not limited to the above-described embodiment. An aspect of the present disclosure can be embodied in various forms including various modifications and improvements based on the knowledge of those skilled in the art, including the above-described embodiment.

The travel plan setting unit 16 may generate a plurality of travel plan candidates based on the peripheral situation of the vehicle V and the state of the vehicle V, and may set one of the generated plurality of travel plan candidates as the first travel plan. After the input of the override operation by the occupant, the travel plan setting unit 16 may set the travel plan candidates that is another one of the plurality of travel plan candidates having a route closest to the position of the vehicle V immediately after the input, as the second travel plan. At this time, the travel plan setting unit 16 may narrow down the plurality of travel plan candidates according to the content of the override operation after the override operation is input. According to this configuration, the first and the second travel plans can appropriately be set according to the traveling environment (peripheral situation) and the traveling state (status) of the vehicle V.

A part of various functions of the ECU 10 may be executed in a computer in a facility such as an information management center that can communicate with the vehicle V.

What is claimed is:

1. An autonomous driving device that is configured to automatically start an autonomous driving control of a vehicle when an autonomous driving start condition is satisfied, the autonomous driving device comprising:
    an autonomous driving release unit configured to release the autonomous driving control if an override operation for shifting the driving of the vehicle to a manual driving is input by an occupant of the vehicle during the execution of the autonomous driving control which is based on a first travel plan;
    a travel plan setting unit configured to set a second travel plan different from the first travel plan based on a peripheral state of the vehicle and a state of the vehicle after the input of the override operation by the occupant;
    an autonomous driving restore determination unit configured to determine whether or not to restore the autonomous driving control with the autonomous driving control which is based on the second travel plan after the input of the override operation by the occupant based on operation parameters relating to the override operation, the first travel plan, and the second travel plan; and
    a vehicle control unit configured to maintain the manual driving and prohibit automatic starting of the autonomous driving control until after a predetermined time elapses after the autonomous driving control is released by the autonomous driving release unit and when the autonomous driving restore determination unit determines not to restore the autonomous driving control.

2. The autonomous driving device according to claim 1, wherein the autonomous driving restore determination unit is configured to determine that the restoration of the autonomous driving control is possible if the operation parameter is larger than a set value and when a difference between a position on a route in the first travel plan and a position on a route in the second travel plan is longer than a set distance.

3. The autonomous driving device according to claim 2, wherein the autonomous driving restore determination unit is configured to determine that the restoration of the autonomous driving control is possible if the operation parameter is equal to or smaller than the set value and when the difference between the position on the route in the first travel plan and the position on the route in the second travel plan is equal to or shorter than the set distance.

4. The autonomous driving device according to claim 1, wherein the travel plan setting unit is configured to newly generate a travel plan based on the peripheral situation of the vehicle and the state of the vehicle immediately after the input of the override operation, and sets the generated travel plan as the second travel plan.

5. The autonomous driving device according to claim 2, wherein the travel plan setting unit is configured to newly generate a travel plan based on the peripheral state of the vehicle and the state of the vehicle immediately after the input of the override operation, and set the generated travel plan as the second travel plan.

6. The autonomous driving device according to claim 3, wherein the travel plan setting unit is configured to newly generate a travel plan based on the peripheral situation of the vehicle and the state of the vehicle immediately after the input of the override operation, and set the generated travel plan as the second travel plan.

7. The autonomous driving device according to claim 1, wherein the travel plan setting unit is configured to set one of a plurality of travel plan candidates generated based on the peripheral situation of the vehicle and the state of the vehicle as the first travel plan, and
    wherein, after the input of the override operation by the occupant, the travel plan setting unit is configured to set a travel plan candidate that is another one of the plurality of travel plan candidates and has the closest route to the position of the vehicle immediately after the input, as the second travel plan.

8. The autonomous driving device according to claim 2, wherein the travel plan setting unit is configured to set one of the plurality of travel plan candidates generated based on the peripheral situation of the vehicle and the state of the vehicle, as the first travel plan, and
    wherein, after the input of the override operation by the occupant, the travel plan setting unit is configured to set a travel plan candidate that is another one of the plurality of travel plan candidates and has the closest route to the position of the vehicle immediately after the input, as the second travel plan.

9. The autonomous driving device according to claim 3, wherein the travel plan setting unit is configured to set one of the plurality of travel plan candidates generated based on the peripheral situation of the vehicle and the state of the vehicle, as the first travel plan, and
    wherein, after the input of the override operation by the occupant, the travel plan setting unit is configured to set a travel plan candidate that is another one of the plurality of travel plan candidates and has the closest route to the position of the vehicle immediately after the input, as the second travel plan.

10. The autonomous driving device according to claim 1, wherein when the autonomous driving restore determination unit determines not to restore the autonomous driving control, a triggered engagement mode occurs in which the autonomous driving control of the vehicle is started by operation of the occupant.

11. The autonomous driving device according to claim 1, wherein the vehicle control unit is also configured to automatically start the autonomous driving control which is based on the second travel plan after the autonomous driving control is released by the autonomous driving release unit and when the autonomous driving restore determination unit determines to restore the autonomous driving control.

12. The autonomous driving device according to claim 11, wherein the autonomous driving restore determination unit is configured to determine that the restoration of the autonomous driving control is possible if the operation parameter is larger than a set value and when a difference between a position on a route in the first travel plan and a position on a route in the second travel plan is longer than a set distance.

13. The autonomous driving device according to claim 12, wherein the autonomous driving restore determination unit is configured to determine that the restoration of the autonomous driving control is possible if the operation parameter is equal to or smaller than the set value and when the difference between the position on the route in the first travel plan and the position on the route in the second travel plan is equal to or shorter than the set distance.

14. The autonomous driving device according to claim 11, wherein the travel plan setting unit is configured to newly generate a travel plan based on the peripheral situation of the vehicle and the state of the vehicle immediately after the input of the override operation, and sets the generated travel plan as the second travel plan.

15. The autonomous driving device according to claim 12, wherein the travel plan setting unit is configured to newly generate a travel plan based on the peripheral state of the vehicle and the state of the vehicle immediately after the input of the override operation, and set the generated travel plan as the second travel plan.

16. The autonomous driving device according to claim 13, wherein the travel plan setting unit is configured to newly generate a travel plan based on the peripheral situation of the vehicle and the state of the vehicle immediately after the input of the override operation, and set the generated travel plan as the second travel plan.

17. The autonomous driving device according to claim 11, wherein the travel plan setting unit is configured to set one of a plurality of travel plan candidates generated based on the peripheral situation of the vehicle and the state of the vehicle as the first travel plan, and
wherein, after the input of the override operation by the occupant, the travel plan setting unit is configured to set a travel plan candidate that is another one of the plurality of travel plan candidates and has the closest route to the position of the vehicle immediately after the input, as the second travel plan.

18. The autonomous driving device according to claim 12, wherein the travel plan setting unit is configured to set one of the plurality of travel plan candidates generated based on the peripheral situation of the vehicle and the state of the vehicle, as the first travel plan, and
wherein, after the input of the override operation by the occupant, the travel plan setting unit is configured to set a travel plan candidate that is another one of the plurality of travel plan candidates and has the closest route to the position of the vehicle immediately after the input, as the second travel plan.

19. The autonomous driving device according to claim 13, wherein the travel plan setting unit is configured to set one of the plurality of travel plan candidates generated based on the peripheral situation of the vehicle and the state of the vehicle, as the first travel plan, and
wherein, after the input of the override operation by the occupant, the travel plan setting unit is configured to set a travel plan candidate that is another one of the plurality of travel plan candidates and has the closest route to the position of the vehicle immediately after the input, as the second travel plan.

20. The autonomous driving device according to claim 11, wherein when the autonomous driving restore determination unit determines not to restore the autonomous driving control, a triggered engagement mode occurs in which the autonomous driving control of the vehicle is started by operation of the occupant.

21. An autonomous driving method for automatically starting an autonomous driving control of a vehicle when an autonomous driving start condition is satisfied, the method comprising:
releasing the autonomous driving control if an override operation for shifting the driving of the vehicle to a manual driving is input by an occupant of the vehicle during the execution of the autonomous driving control which is based on a first travel plan;
setting a second travel plan different from the first travel plan based on a peripheral state of the vehicle and a state of the vehicle after the input of the override operation by the occupant;
determining whether or not to restore the autonomous driving control with the autonomous driving control which is based on the second travel plan after the input of the override operation by the occupant based on operation parameters relating to the override operation, the first travel plan, and the second travel plan; and
maintaining the manual driving and prohibiting automatic starting of the autonomous driving control until after a predetermined time elapses after the autonomous driving control is released by the autonomous driving release unit and upon the determination not to restore the autonomous driving control.

* * * * *